United States Patent [19]

Skiscim

[11] 4,434,278
[45] Feb. 28, 1984

[54] PHOSPHATE ESTERS OF ACRYLATED EPOXIDES

[75] Inventor: Ronald J. Skiscim, Crestwood, Ky.

[73] Assignee: Celanese Corporation, New York, N.Y.

[21] Appl. No.: 423,502

[22] Filed: Sep. 27, 1982

[51] Int. Cl.³ .............................................. C08L 63/00
[52] U.S. Cl. ..................................... 525/531; 525/530; 525/922
[58] Field of Search ...................... 525/531, 922, 530

[56] References Cited

U.S. PATENT DOCUMENTS

| | | | |
|---|---|---|---|
| 2,541,027 | 2/1951 | Bradley | 148/6.15 |
| 2,723,971 | 11/1955 | Cupery | 260/85.7 |
| 3,377,406 | 4/1968 | Newey et al. | 260/837 |
| 3,450,613 | 6/1969 | Steinberg | 204/159.15 |
| 3,524,903 | 8/1970 | Hargis | 525/922 |
| 3,574,794 | 4/1971 | Hargis | 525/922 |
| 3,586,529 | 6/1971 | Aronoff et al. | 117/93.31 |
| 3,847,846 | 11/1974 | Asada | 260/13 |
| 4,001,150 | 1/1977 | Juna et al. | 260/17 R |
| 4,059,550 | 11/1977 | Shimp | 260/29.4 R |
| 4,164,487 | 8/1979 | Martin | 260/29.2 EP |
| 4,250,007 | 2/1981 | Yasuno et al. | 204/159.23 |
| 4,259,117 | 3/1981 | Yamauchi et al. | 106/35 |
| 4,289,812 | 9/1981 | Martin | 427/379 |
| 4,291,097 | 9/1981 | Kamada et al. | 428/412 |
| 4,316,922 | 2/1982 | Perine et al. | 428/35 |
| 4,351,881 | 9/1982 | Kamada et al. | 428/412 |
| 4,360,613 | 11/1982 | Shimp | 523/416 |

*Primary Examiner*—Paul Lieberman
*Attorney, Agent, or Firm*—Herbert P. Price

[57] ABSTRACT

Radiation curable monomers useful in coating compositions are prepared by reacting part of the epoxy groups of a polyepoxide resin with acrylic or methacrylic acid followed by esterifying the remaining epoxy groups with phosphoric acid.

16 Claims, No Drawings

PHOSPHATE ESTERS OF ACRYLATED EPOXIDES

BACKGROUND OF THE INVENTION

This invention relates to processes for preparing unsaturated phosphoric acid esters. In particular, this invention pertains to phosphoric acid esters prepared by reacting phosphoric acid with an epoxy acrylate and to the use of these materials as radiation curable monomers.

Epoxy acrylates, i.e., the reaction products of acrylic acid with diepoxide compounds, are described in U.S. Pat. No. 3,450,613. Resins made from bis-acrylate esters of phosphoric acid are described in U.S. Pat. Nos. 3,847,846; 4,001,150 and 4,291,097. Phosphate esters of epoxy resins are described in U.S. Pat. Nos. 4,164,487; 4,289,812 and 4,316,922.

A large number of phosphate ester compositions, including phenol bis-acrylate types and bisphenol related monoacrylates, in combination with ultraviolet sensitizers, are disclosed in U.S. Pat. No. 4,259,117. Such compositions are made by reacting unsaturated hydroxyl compounds with halophosphates.

Photocurable acrylic phosphate esters of epoxidized polybutadiene are described in U.S. Pat. No. 4,250,007. Such compositions are made by reacting the epoxidized polybutadiene with the reaction product of polycarboxylic acids or anhydrides with hydroxyethylacrylate plus acid phosphoric dimethacrylate or acid butyl phosphate monoester.

One of the major problems in radiation curable systems has been their poor adhesion to metal due in part to the low curing energy and to the resulting shrinkage of the cured film on the metal substrate. Although it is known that phosphorous containing compositions have improved adhesion to metal, it has been difficult to incorporate phosphoric acid itself into radiation curable systems.

Accordingly, it is an object of this invention to prepare radiation curable coating compositions having good adhesion to metal.

It is another object of this invention to prepare compositions which may be used as radiation curable monomers.

It is a further object of this invention to prepare stable phosphoric acid esters of acrylate or methacrylate esters of epoxide resins.

These and other objectives are obtained by preparing the compositions of the instant invention.

SUMMARY OF THE INVENTION

This invention is directed to radiation curable monomers made by reacting acrylic or methacrylic acid with a polyepoxide followed by reacting the resulting acrylated epoxide with phosphoric acid. Basically, the instant invention involves reacting a polyepoxide having n epoxide groups per molecule, wherein n has a value of 2–4, with n−1 moles of acrylic or methacrylic acid and with 0.5 to 1 mole of phosphoric acid when n is equal to 2, and 1 mole of phosphoric acid when n is 3 or 4. The reaction of the phosphoric acid with the acrylated epoxy resin is conducted in the presence of a total of at least one equivalent of water and/or aliphatic hydroxyl compound per mole of phosphoric acid.

The reaction can be conducted in a reactive diluent in the amounts of about 0 to about 75 weight percent diluent based on the total weight of diluent and acrylated phosphated epoxide resin.

DETAILED DESCRIPTION OF THE INVENTION

The polyepoxide compounds which are useful in the instant invention are glycidyl polyethers of aromatic or aliphatic polyols having more than 1 to about 4 epoxy groups per molecule. Such polyepoxides are well known in the art and contain terminal epoxide groups of the 1,2 or vicinal type.

The glycidyl polyethers of aromatic polyols are made by reacting the aromatic polyol with an epihalohydrin as described in U.S. Pat. Nos. 2,801,227; 2,615,007 and 2,615,008. Examples of the epihalohydrins are epichlorohydrin, epibromohydrin, or epiiodohydrin with epichlorohydrin being preferred. The aromatic polyols, or phenols, are exemplified by resorcinol, hydroquinone, p,p'-dihydroxydiphenyl propane (or Bisphenol A as it is commonly called), p,p'-dihydroxybenzophenone, p,p'-dihydroxybiphenyl, p,p'-dihydroxydiphenyl ethane, bis(2-hydroxynaphthyl) methane, 1,5-dihydroxynaphthalene, phloroglucinol and the like.

The glycidyl polyethers of aliphatic polyols are made by reacting the aliphatic polyol with epihalohydrin. A detailed description of the process can be found in U.S. Pat. No. 3,033,803. Useful polyols include glycerine, trimethylolethane, trimethylolpropane, pentaerythritol, ethylene glycol, propylene glycol, 1,4-butanediol, hydrogenated Bisphenol A, 1,4-cyclohexanediol, 1,3-cyclopentanediol, cyclohexanedimethanol, and the like. Additional useful polyepoxides are those based on copolymers of glycidyl acrylate and methacrylate.

The polyepoxides useful in this invention have weights per epoxide from about 100 to about 1600, and preferably from about 175 to about 550 and n epoxide groups per molecule wherein n has a value of about 2 to about 4.

The phosphoric acid used in this invention is ortho phosphoric acid and can be utilized in its pure crystalline form or as its hydrate. Various condensed forms of phosphoric acid, pyrophosphoric acid and triphosphoric acid can also be used provided sufficient water or aliphatic hydroxyl compound is used as described hereinafter. It is preferred to use phosphoric acid in its usual commercial form which is referred to as concentrated phosphoric acid and is about 80–90 weight percent in water.

The unsaturated acids which are reacted with the polyepoxide are acrylic and methacrylic acid with acrylic acid being preferred. The terms, "acrylic acid" and "acrylate esters" as used herein, are intended to include methacrylic acid and methacrylate ester as well as acrylic acid and acrylate ester.

The products of this invention are prepared by first reacting sufficient acrylic acid with a polyepoxide to form an acrylate ester of the polyepoxide while leaving an epoxide group unreacted. This esterification reaction is carried out at a temperature of about 60° C. to about 150° C. and, preferably, from about 100° C. to about 140° C. The reaction is conducted until the acid value indicates that the esterification reaction is complete, i.e., when the acid value is reduced below 10. The time for the reaction will vary from about 30 minutes to about 5 hours depending on the particular reaction conditions.

In order to keep to a minimum the amount of acrylic acid polymerization which can occur during esterification, about 0.01–3.0% by weight, based on the total reaction mixture, of a polymerization inhibitor can be added. Examples of such materials include the quinones, such as hydroquinone and its monomethyl ether, the various phenols, p-tert-butylcatechol, p-methoxyphenol, 2,4-dichloro-6-nitrophenol, n-propyl gallate, di-tert-butyl-p-cresol, 2,2'-methylenebis(4-methyl-6-tert-butylphenol), 1-amino-7-naphthol, p-benzoquinone, 2,6-dichloro-p-benzoquinone, 2-amino-1,4-napthoquinone, 3-aminoanthraquinone, diphenylamine, p-nitrosodimethylaniline, α and β-naphthylamine, nitrobenzene, phenothiazine, hexamethylphosphoramide, n-dodecyl mercaptan, benzenethiol, 2,2-diphenyl-1-picrylhydrazyl (phenyl hydrazine), divinylacetylene, and various antimony and copper salts. Most preferred among the inhibitors are paramethoxyphenol, hydroquinone and its monomethyl ether, phenothiazine and nitrobenzene.

In order to complete the esterification reaction at a low temperature and a reasonable reaction rate, an esterification catalyst of conventional type can be added to the reaction mixture. The esterification catalyst should be added in the range of about 0.1–10 percent, preferably 1–5 percent, based on the total amount of the reactants. Suitable esterification catalysts are paratoluene sulfonic acid (PTSA) and methane sulfonic acid, as well as titanium esters, titanium chelates, or aluminum, bismuth, barium, zinc, copper, tin, chromium, calcium, antimony or cadmium alcoholates, carboxylate esters, halides or alkyl oxides and alkyl aryl ammonium halide salts.

The esterification catalyst may be removed from the reaction medium by means of a cation exchange resin. This resin may be added directly to the reaction mixture and then filtered off, or the finished product may be passed through a cation exchange column. The preferred type of cation exchange resin is of the tertiary amine type. In the alternative the insoluble salt of the reaction catalyst is formed such as by adding ammonia to a PTSA catalyst system. The reaction mixture is then filtered to remove the salted catalyst. In some cases, the esterification catalyst can be retained in the product when its presence will not be deleterious to the final product properties.

Following completion of the esterification reaction between the acrylic acid and the polyepoxide as measured by a reduction to a minimum of the acid value of the reaction mixture, the temperature of the reactants is adjusted, if necessary, and the phosphoric acid is added in the requisite amount.

The reaction between the phosphoric acid and the epoxy acrylate is conducted at temperatures in the range of from about 35° C. to about 125° C., and, preferably, from about 60° C. to about 90° C. The reaction is followed by monitoring the disappearance of epoxide content of the system. Full reaction is usually attained in about 30 minutes to about 5 hours.

The reactant ratios for the compositions of the instant invention may vary over narrow ranges. In carrying out the reaction, one mole of a polyepoxide having n epoxy groups per molecule is initially reacted with about n−1 moles of acrylic acid wherein n is 2–4. The resulting product is then reacted with from about 0.5 to 1 mole of phosphoric acid when n is 2 and with 1 mole of phosphoric acid when n is 3 or 4.

The reaction between the epoxy acrylate ester and the phosphoric acid proceeds smoothly and without gelation when water and/or a compound having an aliphatic hydroxyl group is employed. Such aliphatic hydroxyl containing compounds include $C_1$–$C_{20}$ alcohols, glycols, triols, glycol ethers and the like. Examples of such compounds are methanol, ethanol, isopropanol, butanol, 2-ethylhexanol, decanol, hexadecanol, glycerine trimethylolethane, trimethylolpropane, ethylene glycol, propylene glycol, butylene glycol, monomethylether of ethylene glycol, monoethylether of ethylene glycol, monobutylether of ethylene glycol, monomethylether of diethylene glycol and the like. The amount of hydroxyl that is added is at least about 1 equivalent of hydroxyl per mole of phosphoric acid that is utilized. Although there is no upper limit to the amount of hydroxyl that can be added, from a practical standpoint no more than about 5 equivalents are utilized. The amount of water that is added includes, of course, the water which is added with the phosphoric acid. The preferred hydroxyl compound is water and the lower alcohols with water being most preferred. Mixtures of water and hydroxyl compound can be used as long as the total equivalents of hydroxyl are within the minimum amount. Polymerizable hydroxyl containing monomers can also be used as the hydroxyl compound, examples of such compounds being hydroxyethyl acrylate, hydroxypropyl acrylate, hydroxypropyl methacrylate, allyl alcohol, methallyl alcohol and the like.

It has been found that carrying out the phosphating reaction in a reactive diluent produces products which have improved storage stability. For convenience in conducting the reaction, both stages of the reaction, i.e., the acrylic-epoxy reaction and the phosphoric-epoxy reaction, can be conducted in the reactive diluent. Reactive diluents as used herein are compounds which contain one up to about six unsaturated groups per molecule which can be polymerized by radiation. The reactive diluents useful in this invention have viscosties of less than 2000 cps at 75° C. and which are liquid at room temperature (25° C.), i.e., not gaseous or crystalline. Examples of reactive diluents are acrylate and methacrylate esters of $C_1$–$C_{12}$ monohydric alcohols, vinyl esters of $C_2$–$C_4$ monocarboxylic acids, vinyl aromatic monomers, vinyl heterocyclic monomers, acrylate and methacrylate esters of polyols, polyalkoxyalkyl esters of acrylic and methacrylic acid, and the like. Specific examples of such compounds include vinyl acetate, ethyl acrylate, 2-ethylhexyl acrylate, methyl methacrylate, styrene, vinyl pyrrolidone, ethoxyethoxyethyl acrylate, hexanediol diacrylate, trimethylolpropane triacrylate, tripropylene glycol diacrylate, trimethylolethane trimethacrylate, pentaerythritol tetraacrylate, dipentaerythritol hexaacrylate, and the like. The amount of reactive diluent used will vary from about 0 to about 75 weight percent, preferably from about 20 to about 50 weight percent, based on the total weight of acrylated phosphated polyepoxide and reactive diluent.

In order to be useful as radiation curable coating compositions, the acrylated phosphated polyepoxides must be formulated with reactive diluents as described hereinbefore. The amount of reactive diluent utilized will vary depending on the viscosity desired in the coating composition and on the properties in the cured coating. Such amounts will vary from about 20 to about 75 weight percent based on the total weight of the coating composition. Any reactive diluent utilized in the preparation of the acrylated, phosphated polyepoxide is considered to be reactive diluent in the formulated product.

The compositions of the instant invention are useful in photocurable systems and may be cured by ultraviolet light, electron beam, curtain coaters, and any other type of system which utilizes photons to activate the polymerization of the unsaturated materials prepared herein. The compositions of this invention can be applied by conventional means, including brushing, spraying, dipping, curtain and roll coating techniques, and may, if desired, be dried under ambient or oven conditions.

In order to render the compositions of the instant invention photocurable by ultraviolet light radiation, it is common to employ photosensitizers, such as benzoin, acetophenone, alkylphenone, benzophenone, tricyclic fused ring, pyridal, benzoin ethers, benzil, benzil ketals, alpha-acryloxime ethers, and the like, all as disclosed in U.S. Pat. No. 4,207,155. The photosensitizers are added to the compositions in amounts ranging from about 0.1 to about 15.0 percent by weight, based on the total curable system, preferably from about 1.0 to about 5.0 percent. Although not required, certain organic amine-type activators may be added to these compositions to further enhance the cure rate in amounts ranging up to about 500 percent by weight, based on the photosensitizer, preferably up to about 50 percent by weight. The amines are further described in the above patent.

As previously stated, the compositions of the instant invention find particular utility when used in ultraviolet curable systems to provide coatings for metal, e.g., iron, steel, copper, aluminum and the like.

In the following examples all parts and percentages are by weight unless otherwise indicated.

EXAMPLE 1

To a suitable reactor were added 1948 parts of the diglycidyl ether of Bisphenol A having an epoxide equivalent weight of 181. Heat was applied raising the temperature to 104° C. Acrylic acid, 387 parts, was then added over a 40 minute period with the temperature being held between 104° and 112° C. The temperature was held at 101° C. for 1 hour and 35 minutes to complete the esterification reaction as indicated by an acid value of 0 and an epoxide equivalent weight of 489.

To another reactor were added 249 parts of the epoxyacrylate prepared above. Heat was applied raising the temperature to 49° C. Aqueous phosphoric acid (66 parts of 85% aqueous phosphoric acid plus 21 parts of additional water) was slowly added over a 30 minute period with the temperature rising to 107° C. The temperature was held at 107° C. for two hours, producing a product having an acid value of 144.

The above product was formulated into a coating composition by blending 40.25 parts of the product with 9.75 parts of ethoxyethoxyethyl acrylate and 1.5 parts of hydroxycyclohexyl phenyl ketone. Films were drawn down on steel and aluminum panels using a No. 6 Meyer Rod. The coatings were cured by ultraviolet radiation in a Fusion System Model K-523 Unit using two 300 watt/inch lamps with a line speed of 50 ft./min. in 2 passes.

Adhesion of the cured coatings to the substrate was determined as follows: the coatings were cross-hatched with scratch lines so as to form 100 squares. The cross-hatched area was covered with a No. 600 Scotch Brand Cellophane tape from 3M and even pressure was applied to the tape so that it would adhere evenly to the coating. The tape was then pulled from the coating and the % adhesion was determined by counting the squares which were not removed by the tape. The adhesion on the steel panels was 100% immediately after cure and after 24 hours. The adhesion on the aluminum panels was 98% and 100% respectively.

The phosphated acrylated product was formulated into another coating composition by blending 25 parts of the product with 17.5 parts of hydroxypropyl acrylate, 7.5 parts of trimethylolpropane triacrylate and 1.5 parts of hydroxycyclohexyl phenyl ketone. Coatings on steel panels were cured as described above. The adhesion was 100% initially and after 24 hours.

EXAMPLE 2

To a suitable reactor were added 273 parts of the epoxyacrylate described in Example 1. Heat was applied raising the temperature to 70° C. Aqueous phosphoric acid (32.2 parts of 85% aqueous phosphoric acid plus 5 parts of additional water) was added over a 20 minute period with the temperature rising to 120° C. After the temperature had dropped to room temperature, the product had an acid value of 69 and an infinite epoxide equivalent weight.

The product, 25 parts, was blended with 17.5 parts of hydroxypropyl acrylate, 7.5 parts of trimethylolpropane triacrylate and 1.5 parts of hydroxycyclohexyl phenyl ketone. Coatings were prepared and cured on steel panels using the procedure described in Example 1. The adhesion was 0% initially but was 100% after 24 hours.

EXAMPLE 3

To a suitable reactor were added 857 parts of the diglycidyl ether of Bisphenol A having an epoxide equivalent weight of 198. The temperature was raised to 104° C., at which point the addition of a mixture of 156 parts of acrylic acid, 1.5 parts of esterification catalyst, a chromium metal complex having a boiling point of 280° C., a viscosity of 1,325 cps at 25° C. and a specific gravity of 1.027 gm/cc, and 0.7 parts of hydroquinone, was begun. The addition was completed in one hour with the temperature rising to 113° C. After holding for one hour at 113° C., the reaction was complete as indicated by an epoxide equivalent weight of 480.

Methanol, 150 parts, was added to the reactor and the temperature was raised to 68° C. The addition of 249 parts of 85% aqueous phosphoric acid was begun and was completed in 50 minutes with the temperature being controlled between 68° and 82° C. After holding at 60° C. for 25 minutes, the acid value was 144. The excess methanol was then removed by vacuum distillation. The resulting product had an acid value of 158.

A coating composition was prepared by blending 25 parts of the product with 17.5 parts of hydroxypropyl acrylate, 7.5 parts of trimethylolpropane triacrylate and 1.5 parts of hydroxycyclohexyl phenyl ketone. Coatings prepared on steel panels and cured as described in Example 1 had adhesion values of 100% initially and after 24 hours.

EXAMPLE 4

To a suitable reactor were added 3366 parts of the diglycidyl ether of Bisphenol A having an epoxide equivalent weight of 178. Heat was applied raising the temperature to 104° C., at which point the addition of 680 parts of acrylic acid, 6.1 parts of chromium metal complex and 3 parts of hydroquinone was begun. The addition was completed in one hour with the temperature rising to 110° C. After holding for 3 hours at 110° C., the epoxide equivalent weight was 494.

To another reactor were added 1780 parts of the epoxyacrylate and 489 parts of ethoxyethoxyethyl acrylate. Heat was applied raising the temperature to 49° C. Aqueous phosphoric acid (207 parts of 85% aqueous phosphoric acid and 32 parts of water) was added over 35 minutes with the temperature rising to 99° C. The temperature was held at 93°–99° C. for one hour. The resulting product had an acid value of 62.

To 50 parts of the above product were added 1.5 parts of hydroxycyclohexyl phenyl ketone. Coatings were prepared on steel, aluminum and copper panels and were cured using the procedure described in Example 1. The adhesion on steel and aluminum was determined to be 100% initially and after 24 hours. The adhesion on copper was 99% initially but only 1% after 24 hours.

EXAMPLE 5

To a suitable reactor were added 1975 parts of the epoxy-acrylate described in Example 4, 608 parts of ethoxyethoxyethyl acrylate, and 131 parts of hydroxypropyl acrylate. Heat was applied raising the temperature to 66° C. The addition of a solution of 230 parts of 85% aqueous phosphoric acid and 131 parts of hydroxypropyl acrylate was begun and was completed in one hour and 15 minutes with the temperature rising to 82° C. The temperature rose to 93° C. and was held at this temperature for 1 hour and 20 minutes. The resulting product had an acid value of 53.6 and an epoxide equivalent weight of 49,000.

To 45 parts of the above product were added 5 parts of trimethylolpropane triacrylate and 1.5 parts of hydroxycyclohexyl phenyl ketone. Coatings were prepared on steel, aluminum and copper panels using the procedure described in Example 1. The adhesion on steel was determined to be 98% initially and 100% after 24 hours The adhesion on aluminum was 99% and 60% respectively. The adhesion on copper was 100% initially but 0% after 24 hours.

EXAMPLE 6

Using the same procedure described in the preceding examples 3255 parts of the diglycidyl ether of Bisphenol A having an epoxide equivalent weight of 178 were reacted with 658 parts of acrylic acid using 5.9 parts of chromium metal complex esterification catalyst and 2.7 parts of hydroquinone. The resulting product had an acid value of 0.2 and an epoxide equivalent weight of 491.

2036 parts of the epoxy-acrylate, 746 parts of ethoxyethoxyethyl acrylate, 473 parts of 85% aqueous phosphoric acid and 476 parts of hydroxypropyl acrylate were reacted, producing a product having an acid value of 108 and an epoxide equivalent weight of 32,200

The resulting product, 42.5 parts, was blended with 2.5 parts of ethoxyethoxyethyl acrylate, 5 parts of trimethylolpropane triacrylate and 11.5 parts of hydroxycyclohexyl phenyl ketone. Coatings were prepared on steel and aluminum panels and were cured using the procedure described in Example 1. The adhesion on steel was determined to be 0% initially but 100% after 24 hours. Adhesion on aluminum was 0% and 95% respectively.

EXAMPLE 7

Using the same procedure described in the preceding examples, 1191 parts of a glycidyl polyether of Bisphenol A having an epoxide equivalent weight of 506, 319 parts of ethoxyethoxyethyl acrylate, and 84.7 parts of acrylic acid were reacted to form an epoxy acrylate. This epoxy acrylate, after the addition of 21.2 parts of ethoxyethoxyethyl acrylate, was reacted with 70.9 parts of 85% aqueous phosphoric acid and 11.2 parts of water. The resulting product had an acid value of 39 and an epoxide equivalent weight of 59,960.

The resulting product, 53.3 parts, was blended with 15.6 parts of ethoxyethoxyethyl acrylate, 31.1 parts of trimethylolpropane triacrylate and 3 parts of hydroxycyclohexyl phenyl ketone. Coatings were prepared on copper, aluminum, steel, black plate and aluminum foil and were cured using the procedure described in Example 1. Adhesion on copper was 100% initially and after 48 hours. Adhesion on aluminum was 99% initially and 100% after 48 hours. Adhesion to steel was 100% initially and after 48 hours. Adhesion to black plate and aluminum foil was 0% in both instances.

EXAMPLE 8

Using the same procedure described in the preceding examples, 1405 parts of a glycidyl polyether of Bisphenol A having an epoxide equivalent weight of 506, 100 parts of acrylic acid and 377.1 parts of ethoxyethoxyethyl acrylate were reacted to form an epoxy-acrylate. This epoxy-acrylate, after the addition of 56 parts of ethoxyethoxyethyl acrylate, was reacted with 193.7 parts of 85% aqueous phosphoric acid and 30.2 parts of water. The resulting product had an acid value of 61 and an epoxide equivalent weight of 75,550.

The product, 62.5 parts, was blended with 7.5 parts of ethoxyethoxyethyl acrylate, 30 parts of trimethylolpropane triacrylate and 3 parts of hydroxycyclohexyl phenyl ketone. Coatings were prepared on copper, aluminum, steel, black plate and aluminum foil panels and were cured using the procedure described in Example 1. Adhesion on copper was determined to be 0% initially, but 90% after 48 hours. On aluminum, adhesion was 0% initially and 100% after 48 hours. On steel, the adhesion was 100% in both instances. On black plate, it was 0% and 80% respectively. On aluminum foil, it was 0% in both instances.

EXAMPLE 9

To a suitable reactor were added 625 parts of the diglycidyl ether of Bisphenol A having an epoxide equivalent weight of 191. Heat was applied raising the temperature to 121° C. A monomer-catalyst solution of 1072 parts of butyl acrylate, 380 parts of vinyl acetate, 457 parts of glycidyl methacrylate 55 parts azobisisobutyronitrile and 53.7 parts of n-octyl mercaptan was added over a 3 hour period with the temperature varying between 121° and 129° C. Heating up to 150° C. was continued for 1 hour. The temperature was adjusted to 104° C. and a solution of 350 parts of acrylic acid, 7.5 parts of chromium metal complex esterification catalyst and 2.8 parts of hydroquinone was added over 1 hour with the temperature being held at 110°–127° C. After the completion of the addition, heating at 107° C. was continued for 50 minutes. The acid value was 0.01 and the epoxide equivalent weight was 2688.

The temperature was dropped to 58° C., and aqueous phosphoric acid (128.8 parts of 85% aqueous phosphoric acid and 40.3 parts of water) was added over a period of 1 hour and 5 minutes with the temperature being held at 58° C. After holding for an additional hour at this temperature, the product had an acid value of 40 and an epoxide equivalent weight of 22,500.

Coatings prepared from this composition were cured by ultraviolet radiation using the procedure described in the preceding examples.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A radiation curable composition prepared by the process of reacting 1 mole of a polyepoxide having n epoxide groups per molecule, wherein n has a value of 2–4, with about n−1 moles of acrylic acid or methacrylic acid, followed by reacting the resulting product with about 0.5 to 1 mole of phosphoric when n is 2 and 1 mole of phosphoric acid when n is 3 or 4 in the presence of at least about 1.0 equivalent of a hydroxyl group-containing material per mole of phosphoric acid.

2. The composition of claim 1 wherein the acid is acrylic acid.

3. The composition of claim 1 wherein the acid is methacrylic acid.

4. The composition of claim 1 wherein the hydroxyl group-containing material is water.

5. The composition of claim 1 wherein the hydroxyl-containing material is an aliphatic hydroxyl group-containing compound.

6. The composition of claim 5 wherein the aliphatic hydroxyl group-containing material is a $C_1$–$C_{20}$ alcohol.

7. The composition of claim 1 wherein the polyepoxide is a polyglycidyl ether of a dihydric phenol.

8. A radiation curable composition prepared by the process of reacting about 1 mole of a polyepoxide having about 2 epoxide groups per molecule with about 1 mole of acrylic acid, followed by reaction of the resulting product with about 1 mole to about 0.5 mole of phosphoric acid in the presence of at least about 1.0 equivalent of hydroxyl group per mole of phosphoric acid.

9. A process for preparing an ultraviolet curable monomer which produces good adhesion to metal in cured state coatings, which comprises reacting about 1 mole of a polyepoxide having n epoxide groups per molecule wherein n has a value of about 2 to about 4 with about n−1 moles of acrylic acid, followed by reaction of the resulting product with about 0.5 to about 1 mole of phosphoric acid when n is 2 and 1 mole of phosphoric acid when n is 3 or 4 in the presence of at least about 1 equivalent of a hydroxyl group-containing material per mole of phosphoric acid.

10. The process of claim 9 wherein the hydroxyl group-containing material is an aliphatic hydroxyl group-containing compound.

11. The process of claim 9 wherein the hydroxy-containing material is water.

12. The process of claim 9 wherein the aliphatic hydroxyl group-containing material is a $C_1$–$C_{20}$ alcohol.

13. The process of claim 9 wherein the polyepoxide is a polyglycidyl ether of a dihydric phenol.

14. The process of claim 9 wherein the reaction is conducted in the presence of a reactive diluent, wherein said reactive diluent contains one to about six unsaturated groups per molecule.

15. The process of claim 14 wherein the reactive diluent is present in the amount of about 0 to about 75 weight percent based on total weight of acrylated phosphated polyepoxide and reactive diluent.

16. The process of claim 15 wherein the reactive diluent is present in the amount of 20 to 50 weight percent.

* * * * *